April 20, 1943.  H. K. MEARIG  2,317,331
METHOD AND APPARATUS FOR THE MANUFACTURE OF CORK COMPOSITION
Filed July 31, 1940
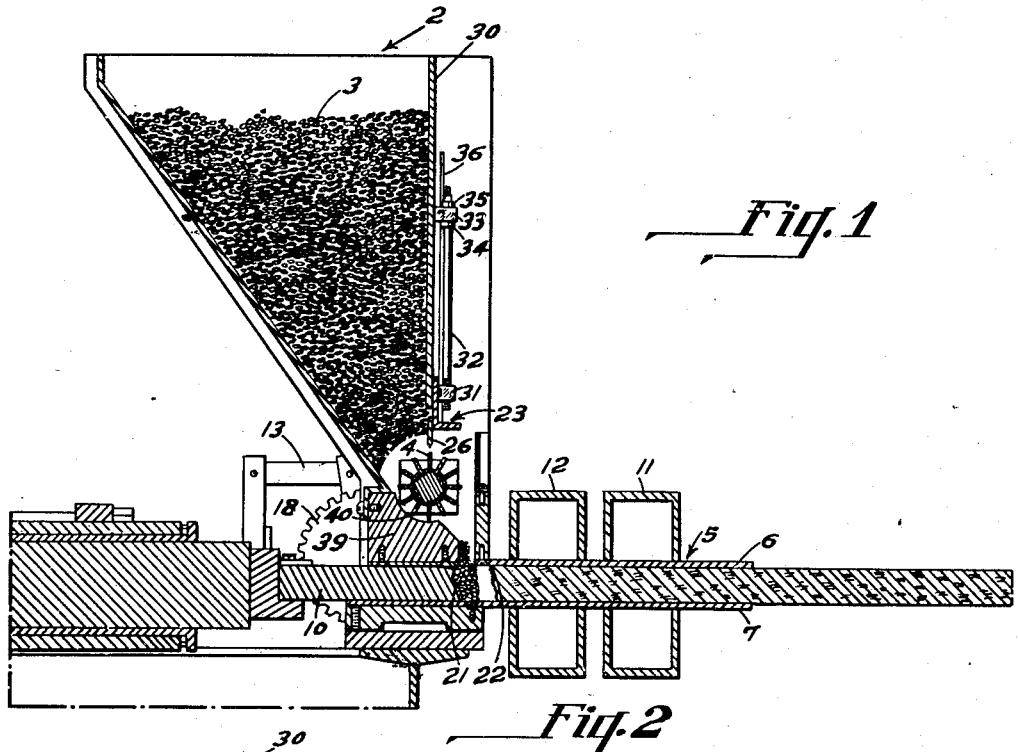
*Fig. 1*
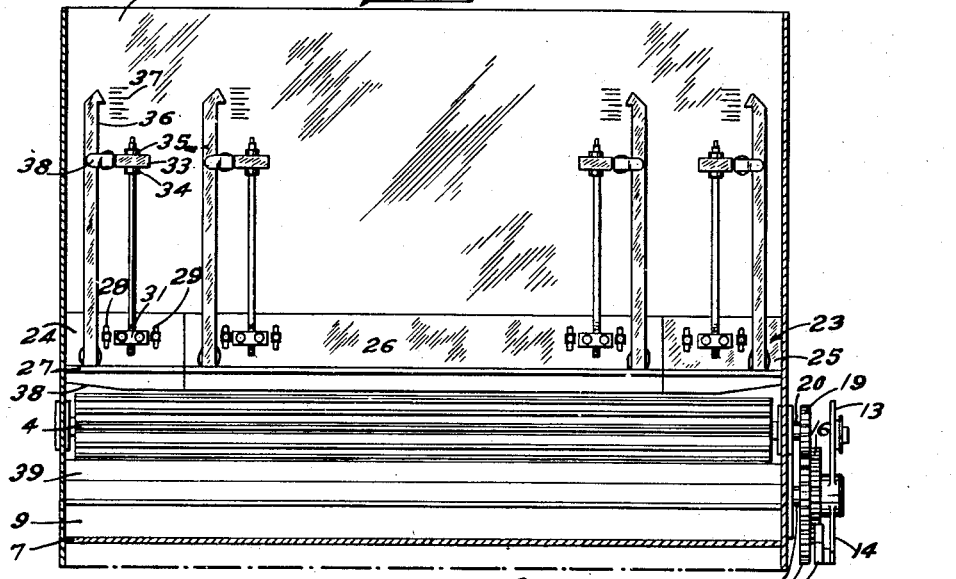
*Fig. 2*
*Fig. 3*
Inventor
Henry K. Mearig
by
Walter F. Kaufman
Attorney Patented Apr. 20, 1943

2,317,331

UNITED STATES PATENT OFFICE 2,317,331

METHOD AND APPARATUS FOR THE MANUFACTURE OF CORK COMPOSITION

Henry K. Mearig, Lancaster, Pa., assignor to Armstrong Cork Company, Lancaster, Pa., a corporation of Pennsylvania Application July 31, 1940, Serial No. 348,714

18 Claims. (Cl. 18—12)

This invention relates to a process and apparatus for the manufacture of plastic composition and more particularly to a method and apparatus for the manufacture of cork composition by the process known in the art as "extrusion." The invention finds particular usefulness in the manufacture of relatively large size slabs of such product. In the manufacture of cork composition slabs for use in the fabrication of expansion joints, for example, where the extruded mass will have a thickness of two inches, a width of four feet and be of indefinite length, a great deal of difficulty has been experienced in obtaining a final product having a uniform density throughout its thickness and in avoiding the problem of fissuring at the longitudinal edges and upper surface of the mass as it is formed by the extrusion process.

In the manufacture of cork composition bodies by the extrusion process, cork granules thinly coated with a suitable binder are charged into a hopper from which they are fed by a suitable metering discharge device into an extrusion chamber, the cross-sectional shape of which corresponds to the cross-sectional shape of the body being formed. After each discharge of cork granules from the hopper into the extrusion chamber, a reciprocating extrusion plunger is caused to move such cork granules charged therein forwardly into the molding chamber compacting such granules into engagement with the previously compacted granules fed in preceding charges. The binder employed is of a thermoplastic or heat setting character and, accordingly, heat is applied by means of a jacket which surrounds the molding chamber and is effective for curing or setting the binder which coats the cork granules. As increments of freshly charged cork granules and binder are forced into the receiving or entrance end of the extrusion chamber, the cured body is forced from the exit end thereof as a substantially continuous length in which the binder is substantially set or cured and holds the mass in shape.

When a body of a desired length has been formed, it is severed transversely of its length and is then further fabricated into the desired articles. For example, if the product to be finally manufactured is an expansion joint material, say one and one-half inches thick by eight inches wide by fourteen feet long, a slab of extruded material two inches thick and slightly over fourteen feet long would be formed and severed from the body. This slab would then be subsequently severed in a direction parallel to its length into strips eight inches wide.

The problems encountered in the manufacture of this character of material may be briefly summarized as follows:

1. The mass is formed of many cork granules varying in size and of irregular shape. The smaller granules apparently tend to gravitate downwardly and, accordingly, when an increment of cork granules is deposited into the extrusion chamber, the smaller granules tend to deposit at the bottom of the chamber and the larger size granules are disposed toward the top. It is obvious that the smaller granules when compacted produce a denser mass than the larger particles and, accordingly, considerable difficulty has been encountered in attempting to maintain a uniform density throughout the thickness of the final product.

2. When there is an uneven density in the mass of cork particles fed to the extrusion chamber, the mass upon completion of the baking cycle and emergence from the extrusion chamber tends to expand more in the less dense areas at the upper surface and, accordingly, fissures or ruptured areas in the upper surface of the formed mass appear. These may be relatively deep and extend over a considerable length.

3. Considerable difficulty has been encountered in maintaining smooth square edges on the longitudinal portion of the finished article. This has been occasioned primarily because the cork granules which are coated with the binder fail to properly fill into the corners of the open mouth of the extrusion chamber. This has resulted in rough, irregular edges and has caused some fissuring along the longitudinal edges.

4. Some difficulty has been encountered with the tendency for the cork granules to adhere to the surface of the extrusion plunger which engages the cork granules on each compacting stroke of the machine, building up on such surface and, after a time, becoming loose and breaking away from the plunger as a solid mass, being charged with fresh uncompacted granules into the extrusion chamber, the resulting product including "plugs" which are formed of such highly compacted cork granules.

It is an object of the present invention to overcome the obstacles above referred to and thereby produce a cork composition body having a relatively more uniform density from face to face thereof than heretofore, with clear, sharp longitudinal edges and smooth, plane upper and lower surfaces, substantially free of fissures.

This object is attained in accordance with this invention by providing at the entrance end of the extrusion tube, a cork composition receiving chamber having a sloping or tapered rear wall preferably formed of the compressing surface of the extrusion plunger. The upper portion of the chamber will receive a larger volume of cork than the lower portion where the fines normally gravitate and this is enhanced by a tendency of the cork granules to slide upwardly along the tapered surface of the plunger as it moves into the extrusion tube, increasing the volume adjacent the upper surface thereof and concomitantly increasing the density of the final product at such surface, bringing the density of the product to a more uniform basis throughout its thickness.

With this arrangement, when each charged mass of cork granules is compacted into the extrusion tube by the extrusion plunger, the upper portion of the mass, which contains a greater volume than the lower portion will be compressed to a greater extent than the lower portion thereof—both are reduced to the same volume—but, due to the fact that the lower portion includes finer granules which of necessity form a denser product, the final product formed will be more uniform. By thus charging the material at each stroke of the extrusion plunger, it is possible to control the density of the product at the surfaces and eliminate the creation of any undue strains within the product which, upon exit of the product from the extrusion tube, would cause fissuring at the upper surface.

It has been determined that the problem of fissuring at the longitudinal edges may be eliminated by feeding at each stroke of the extrusion plunger a mass of cork granules greater in volume adjacent the longitudinal edges of the extrusion chamber than at the central portion thereof, thus insuring that adequate cork granules will be charged at the edges, providing proper filling of the extrusion tube adjacent the longitudinal edges and likewise slightly increasing the density of the mass in the region of the longitudinal edges.

In order that the invention may be more readily understood, the same will be described in connection with the attached drawing in which Figure 1 is a longitudinal sectional view of a conventional extrusion machine for the formation of slabs of cork composition embodying my invention;

Figure 2 is a section view thereof; and

Figure 3 is a detailed sectional view of the cork receiving chamber of Figure 1.

Referring first to Figure 1, there is shown a hopper 2 adapted to receive a mass of cork granules 3 which are thinly coated with a binder. In the manufacture of expansion joint material the binder may comprise a "Bakelite" or other synthetic resin and a plasticizer effective for softening the cork and plasticizing the binder to some extent at least. The mass of cork granules has been broken away in Figure 1 by a chain line to permit a clear view of the metering device, but under normal operating conditions the mass of cork granules 3 will fill the vanes of the metering wheel 4 which forms the bottom of the hopper.

The extrusion tube 5 includes an upper plate 6 and a lower plate 7. Its longitudinal edges are closed by similar plates which are not visible in Figure 1 but one of which, number 8, is shown in Figure 3. Thus, the tube has four side walls and open ends, one of which opens into a cork receiving chamber 9 disposed at the bottom of hopper 2 below the metering wheel 4. An extrusion plunger 10 reciprocates through this chamber and serves to convey cork granules deposited in the chamber into the extrusion tube where they are compacted and moved therethrough during curing, emerging as a mass having a cross-sectional shape corresponding to the cross-sectional shape of the interior of the tube. The plunger 10 slides smoothly within the tube 5.

A heating jacket 11 surrounds the walls forming the extrusion tube 5 and is supplied with a suitable heating fluid such as steam which is effective for baking or curing the cork mass as it passes through the tube. In order to prevent the transfer of heat from the heating jacket 11 to the mass of cork granules deposited into the cork receiving chamber 9, and to limit any heat expansion of the cork granules in a direction toward the exit end of the machine, cooling jacket 12 is provided in which cooling fluid such as water may be circulated in order to prevent the transfer of heat from the chamber 11 along the walls 6, 7, and 8 of the tube 5 toward the chamber 9. (Figures 1 and 3.)

The vaned feeding wheel 4 is rotated in synchronization with the reciprocation of extrusion plunger 10. This is effected by means of a link arrangement 13 connected to the mechanism for reciprocating plunger 10, the linkage imparting a reciprocatory motion to an arm 14 (Figure 2) which carries a pawl 15 engageable with a ratchet wheel 16 keyed to a trunnion 17. Also keyed to the trunnion 17 is a gear 18 which meshes with a gear 19 secured to cross shaft 20 of the vaned feeding wheel 4. The arrangement is such that upon forward motion of the plunger 10 (in the righthand direction as viewed in Figure 1), the arm 14 is rocked by linkage 13 and the pawl 15 is brought into engagement with the ratchet wheel 16, thus imparting rotation thereto and, since gear 18 is keyed to the same shaft as the ratchet wheel 16, coincidental rotation is imparted to the gear 18 and through gear 18 to gear 19 which is attached to the cross shaft of the feeding wheel 4. Thus, upon forward motion of the ram 10 a slight rotation of the feeding wheel 4 occurs and cork granules deposited in the vanes thereof are ejected therefrom and fall by gravity into the chamber 9.

It will be noted from Figure 3 that the chamber 9 has its rear wall defined by the leading edge 21 of the extrusion plunger 10 and that this surface 21 tapers or slants rearwardly and upwardly thus forming a chamber having greater capacity at the top, near the top plate 6, than at the bottom near plate 7. An attempt has been made in Figure 1 to show the general orientation of the cork particles deposited from the metering wheel 4 into the chamber 9 with the fine particles disposed in the lower portion of the chamber and the larger particles at the top. Because of the inclined rear wall 21, a greater volume of granules may be disposed in the upper portion of the chamber than in the lower portion.

As the plunger is moved forward, after charging of the cork granules into the chamber 9 has been effected, the granules are moved into the extrusion tube 5 and are there forced into compacted engagement with the previously charged and compacted mass 22 and an increment is forced out of the exit end of the tube, completely baked or cured. Since the mass as charged into the cork receiving chamber 9 is free to follow the inclined surface 21 to an area of greater volume at the upper regions than at the lower regions where the fines have gravitated, a relatively greater compression will occur at the upper portion of the charged mass than at the lower portion, but since the particles are generally oriented with the gradient running from coarse at the top to fine at the bottom, the resulting product has a relatively more uniform density and there appears to be a slight increase in the density of the upper surface over the density of the center of the body.

The amount of taper on the extrusion plunger 10 will depend, to some extent of course, upon the amount of excess volume required at the upper portion of the extrusion chamber in order to attain the required density at the upper surface of the finished body and the frictional qualities of the particles being operated upon. With a one and one-half inch plunger a taper of one-fourth inch from bottom to top has been found satisfactory. The angle of attack should be other than normal to the direction of movement of the plunger being inclined rearwardly of the direction of travel at an angle less than ninety degrees so that the desired movement of the particles along this surface will be effected.

It has been found in commercial practice that, with the inclined face 21 on the plunger 10, the usual difficulty with particles adhering to the face of the plunger and after a time breaking away and being deposited in the extruded mass has been obviated. The exact reason for this is not understood but when the machine is viewed in operation there appears to be a rolling action in which the particles tend to move along the inclined surface 21.

This sliding or rolling action apparently continuously wipes the surface 21 and inhibits the adherence of any particle, at the same time keeping the surface highly polished and effects an apparent increase in the volume of the particles disposed at the upper surface of the extrusion tube. In other words, there is a gradient of cork particles from fines at the bottom to larger particles at the top and a generally proportional gradient of volume from top to bottom, whereas, with prior machines, the volume has been substantially uniform but the size gradient has been toward fines at the bottom. This has resulted in a gradually decreasing density in the final product from bottom to top as formed and fissuring at the upper surface has been the result.

In order to predetermine the amount of cork granules discharged by the metering wheel 4, there is provided a scraper bar or sluice gate 23 which is disposed above the vanes of the wheel 4 and is effective for determining the amount of cork carried thereby. In order to provide for extremely close control of the quantity of cork granules fed to the machine, particularly at the longitudinal edges thereof, the gate 23 is preferably articulated so as to provide sections 24 and 25 adjacent the edges thereof and a middle section 26, each section being individually adjustable. As shown best in Figure 2, each portion of gate 23 is provided with an angle frame 27 to which the gate portions 24, 25, and 26 are secured as by welding. The frames 27 are provided with slots 28 and 29 through which pass bolts serving to adjustably secure the gates to the main face plate 30 of the hopper 2. A screw threaded block 31 is attached to each frame 27 and is adapted to receive an adjusting screw 32 which passes through a bearing 33 secured to the main plate 30 of the hopper. Collars at 34 and 35 are secured to the screw 32 and are disposed on opposite sides of the bearing 33 and prevent vertical movement of the screw 32. The screw 32 is provided with a hexagonal head which receives the open end of a wrench and upon rotation thereof the threaded portion of the screw 32 threads the block 31 to impart movement in a vertical direction to the segment of the gate 23 to which it is related.

An indicator 36 is secured to each segment of the gate 23, the segment 26 having two indicators as shown in Figure 2. Graduations 37 are painted or otherwise placed on plate 30 and this combination provides for convenient adjustment of the individual segments as required by the product being produced. A guide 38 welded to the plate 30 is provided for each indicator and this holds the indicator in proper position with respect to the plate close to the graduations for proper reading.

The edge segments 24 and 25 of gate 23 are tapered at 38 toward the ends of the metering wheel 4 so that a greater amount of cork may be deposited into the chamber 9 adjacent the longitudinal edges of the extrusion tube 5. By this arrangement, the edge portions receive a greater charge of cork than the center or body portion and fissuring at the longitudinal edges is eliminated. In the event the tapered gates 24 and 25 do not alone provide a sufficient increase in volume at the edges, these gates may be elevated slightly with respect to gate 26 to effect a proper relationship between edge volume and center volume and accomplish the desired result.

The metering wheel 4 operates in a base block 39 which is contoured at 40 to pass the vanes of the wheel but prevent the escape of cork granules into the chamber 9 except when fed by the metering wheel. This block 39, the metering wheel 4 and the gate or sluice bar 23 provide a bottom for the hopper 2. As pointed out in the fore part of this specification, the cork granules are relatively loose and fill the vanes of the wheel 4 disposed within the confines of the hopper 2, being broken away in Figure 1 to permit more convenient illustration of the feeding mechanism.

The method of my invention has been generally described in conjunction with the description of the apparatus. It is here summarized and described in somewhat more detail. The method will be considered in connection with the manufacture of an expansion joint material extruded as a mass one and one-half inches thick and forty-eight inches wide and of indefinite length. A batch 3, which may comprise cork granules thinly coated with a binder of resin and a plasticizer, for example, is charged into the hopper 2 and the machine started up. The mechanism which reciprocates the extrusion plunger 10 and the metering wheel 4, through the associated mechanism including the linkage 13, previously described, is arranged so that the wheel 4 makes about one-sixth of a revolution upon each forward stroke of the plunger 10, thus discharging into the chamber 9 the cork granules carried by two of the vanes of the metering wheel 4. The tapered portions 38 of the gates 25, in this instance, extend inwardly from the edges of the vanes of the metering wheel 4 a distance of about four inches and are tapered about one-fourth inch in this distance and result in the discharge of greater volume of granules at the edges than in the central portion. The charge of cork granules fed into the chamber 9 will orient itself with a preponderant portion of the fines disposed at the bottom of the chamber and the larger particles grading upwardly toward the top of the chamber. The charged mass is moved from chamber 9 into the extrusion tube by the inclined pressing surface 21 of the plunger 10 and the particles tend to move along this surface building up a larger volume in the zone of the upper plate 6 of the extrusion tube where the larger particles are oriented than at the lower portion where the fine particles have gravitated, the difference in volume being calculated to approximately balance the particle size with volume in order that upon compression of the charge to a substantially uniform volume a substantially uniform density will result or at least the upper regions will be as dense as the central portion of the body. As subsequent charges are fed to the machine, the compacted mass is moved through the heating zone and finally emerges from the exit end of the extrusion tube as a bonded body.

In my method, where a greater volume of cork particles is disposed at or adjacent the longitudinal edges of the extrusion tube, a somewhat denser product is formed at longitudinal edges of the finished body and thus fissuring there is obviated.

It is believed that the absence of fissuring at both the longitudinal edges and at the upper face when practicing the method of my invention is a result of the elimination of low density areas in the finished product at those points. It appears that there is some moisture or gas within the formed mass and this naturally follows the areas of lightest density in its escape upon emergence of the finished product from the extrusion tube. This probably results in fissuring. By providing a relatively uniform density, these gases and moisture escape more uniformly throughout the entire body of the mass and since the upper surface is not less dense than the central portion it seems to hold the body against rupture. While this theory is plausible, of course, the invention is not to be limited by it. In any event, in commercial practice it has been found that a board of excellent quality may be produced having relatively smooth uniform surfaces.

While I have illustrated and described certain preferred embodiments of my invention, it will be understood that the invention may be otherwise embodied and practiced within the scope of the following claims.

I claim:

1. Apparatus for the extrusion of cork composition bodies and the like from a mass of particles comprising a hollow forming tube through which the particles are forced and bonded together, a chamber for the reception of particles to be introduced into said tube, and an extrusion plunger having substantially its entire compressing surface inclined in one direction at an angle less than ninety degrees with respect to a line drawn parallel to the direction of movement of the plunger movable through said chamber into said tube.

2. Apparatus for the extrusion of cork composition bodies and the like from a mass of particles comprising a substantially horizontally disposed forming tube through which the particles are forced and bonded together, a chamber adjacent said tube for the reception of cork particles to be introduced into said tube, and an extrusion plunger having substantially its entire compressing surface inclined upwardly and rearwardly of the direction of movement of the plunger in compressing and movable through said chamber into said tube.

3. Apparatus for the extrusion of cork composition bodies and the like from a mass of particles comprising a hollow forming tube through which the particles are forced and bonded together, an open topped chamber for the reception of particles to be introduced into said tube, and an extrusion plunger having substantially its entire compressing surface inclined in one direction at an angle less than ninety degrees with respect to a line drawn parallel to the direction of movement of the plunger movable through said chamber into said tube.

4. Apparatus for the extrusion of cork composition bodies and the like from a mass of particles comprising a hollow forming tube through which the particles are forced and bonded together and an extrusion plunger having substantially its entire compressing surface inclined in one direction at an angle less than ninety degrees with respect to a line drawn parallel to the direction of movement of the plunger movable into said tube.

5. Apparatus for the extrusion of cork composition bodies and the like from a mass of particles comprising a hollow forming tube through which the particles are forced and bonded together, an open topped chamber for the reception of particles to be introduced into said tube, means for discharging granules by gravity into said chamber, and an extrusion plunger having substantially its entire compressing surface inclined in one direction at an angle less than ninety degrees with respect to a line drawn parallel to the direction of movement of the plunger movable through said chamber into said tube to force the deposited particles into the tube.

6. Apparatus for the extrusion of cork composition bodies and the like from a mass of particles comprising a hollow forming tube through which the particles are forced and bonded together, an open topped chamber for the reception of particles to be introduced into said tube, means for discharging said particles by gravity into said chamber, and an extrusion plunger having substantially its entire compressing surface inclined rearwardly to the direction of travel of said plunger through said chamber into said tube in an amount sufficient to induce a rolling action of the particles along such surface as they are moved from said chamber into said tube movable through said chamber and into said tube.

7. Apparatus for the extrusion of cork composition bodies and the like from a mass of particles comprising an extrusion tube, an extrusion plunger, a chamber for the reception of particles to be introduced into said tube by said plunger, said plunger having substantially its entire compressing surface inclined at an angle less than ninety degrees with respect to a line drawn parallel to the direction of movement of the plunger, said surface defining the rear wall of said chamber.

8. Apparatus for the extrusion of cork composition bodies and the like from a mass of particles comprising a substantially horizontally disposed forming tube of rectangular cross-section through which the particles are forced and bonded together, a chamber adjacent said tube for the reception of cork particles to be introduced into said tube, and an extrusion plunger of rectangular cross-section movable through said chamber into said tube, the forward edge of said plunger being tapered rearwardly and upwardly of the direction of travel of said plunger in compression, substantially entirely from its lower surface to its upper surface.

9. Apparatus for the extrusion of cork composition bodies and the like from a mass of particles comprising a hollow forming tube through which the particles are forced and bonded together, a chamber for the reception of particles to be introduced into said tube, a metering device for depositing particles into said chamber in greater volume adjacent the transverse edges of said chamber than at the central portion thereof, and an extrusion plunger movable through said chamber into said tube to convey said charged granules from said chamber into said tube.

10. Apparatus for the extrusion of cork composition bodies and the like from a mass of particles comprising a hollow forming tube through which the particles are forced and bonded together, an extrusion plunger, a chamber for the reception of particles to be introduced into said tube, said chamber being disposed between said tube and said plunger and extending transversely of the tube, means for metering particles and for depositing the same by gravity into said chamber, and adjustable means for varying the quantity of granules discharged into said chamber at different points transversely thereof.

11. Apparatus for the extrusion of cork composition bodies and the like from a mass of particles comprising a hollow forming tube through which the particles are forced and bonded together, a chamber for the reception of particles to be introduced into said tube, a measuring device for predetermining the quantity of particles applied to said chamber transversely thereof including a vaned metering wheel and a sluice gate, said gate having adjustable edge portions whereby a greater quantity of particles may be carried by said vaned metering wheel at the edges thereof than at the central portion for deposit into said chamber by gravity feed therefrom.

12. In the method of extruding cork composition and like slabs from a mass of particles varying in size, the extruded body having a tendency to surface fissure, the steps comprising disposing a charged mass of said particles in an extrusion tube with a greater volume of particles in those areas which will form the surfaces of the slab likely to fissure than at other areas, and compressing such mass to a substantially uniform volume.

13. In the method of extruding cork composition and like slabs from a mass of particles varying in size, the extruded body having a tendency to surface fissure, the steps comprising intermittently disposing incremental masses of particles in an extrusion tube with a greater volume of particles of each increment in those areas which will form the surfaces of the slab likely to fissure than at other areas, intermittently compressing said increment to reduce each increment to a substantially uniform volume, continuously heating said compressed increments, and extruding the same from the tube as a cured slab substantially free from surface fissures.

14. In the method of extruding cork composition and like slabs from a mass of particles varying in size, the extruded body having a tendency to surface fissure, the steps comprising disposing said particles in an extrusion tube with the particle size gradient thereof substantially proportional to the volume gradient thereof, compressing said mass to a substantially uniform volume, and forming said mass by the application of heat thereto while under pressure.

15. In the method of extruding cork composition and like slabs from a mass of particles varying in size, the extruded body having a tendency to surface fissure, the steps comprising disposing a mass of said particles in a substantially horizontally disposed forming chamber with a greater volume of particles at the upper surface of said mass than at the lower surface thereof and compressing said charged mass to a substantially uniform volume.

16. In the method of extruding cork composition and like slabs of generally rectangular cross-section from a mass of particles varying in size, the extruded body having a tendency to surface fissure along the longitudinal edges thereof, the steps comprising charging a mass of said particles into an extrusion tube with a greater volume of particles disposed in those areas which will form the longitudinal edges of a slab than at the central portion thereof, compressing said charged mass to a substantially uniform volume in the tube and progressively extruding said product from said tube by feeding and compressing additional similar charges therein.

17. In the method of extruding cork composition and like slabs of generally rectangular cross-section from a mass of particles varying in size, the extruded body having a tendency to surface fissure along the upper surface and the longitudinal edges thereof, the steps comprising charging a mass of said particles into an extrusion tube with a greater volume of particles disposed in those areas which will form the upper surface of a slab and the longitudinal edges thereof than at the remaining portions of the area of the slab and compressing said charged mass to a substantially uniform volume in the tube and progressively extruding said product from said tube by feeding and compressing additional similar charges therein.

18. In the method of extruding cork composition and like slabs from a mass of particles varying in size and coated with a binder, the steps comprising compressing increments of said particles disposed as a mass with the particles graded generally from coarse to fine and with a greater volume of particles in the coarse area than in the fine area to reduce the same to a substantially uniform volume and setting said mass with said particles held under compression by said binder.

HENRY K. MEARIG.